Oct. 7, 1958    R. E. HOUSER    2,855,212
INDEPENDENT FRONT WHEEL TORSION SUSPENSION FOR VEHICLES
Filed Nov. 5, 1956    4 Sheets-Sheet 2

INVENTOR.
RAY E. HOUSER
BY
Oldham & Oldham
ATTYS.

Oct. 7, 1958     R. E. HOUSER     2,855,212
INDEPENDENT FRONT WHEEL TORSION SUSPENSION FOR VEHICLES
Filed Nov. 5, 1956     4 Sheets-Sheet 3
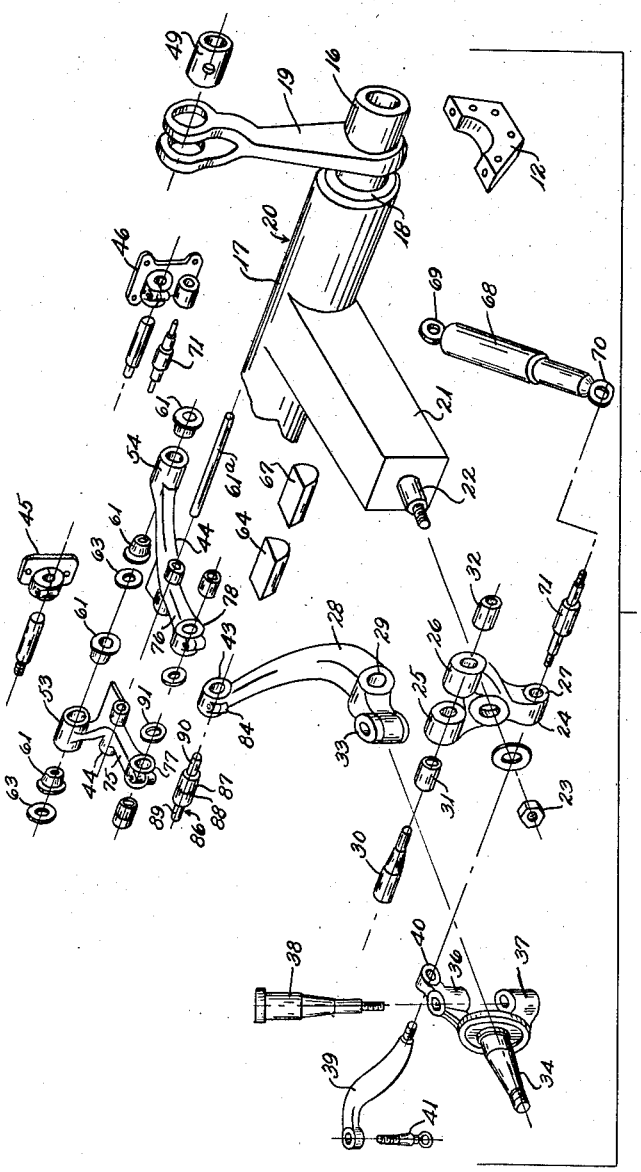
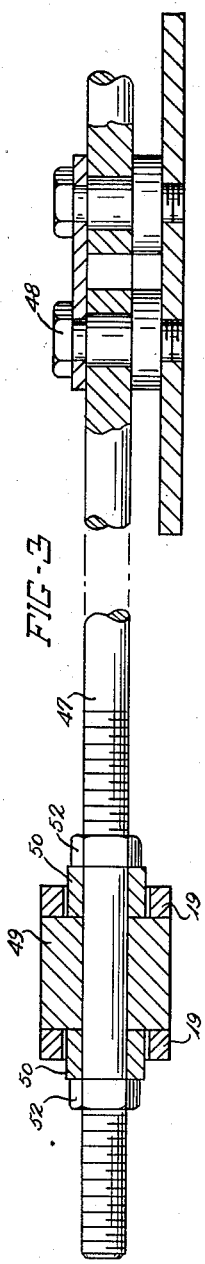
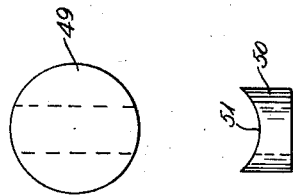
INVENTOR.
RAY E. HOUSER
BY
Oldham & Oldham
ATTYS.

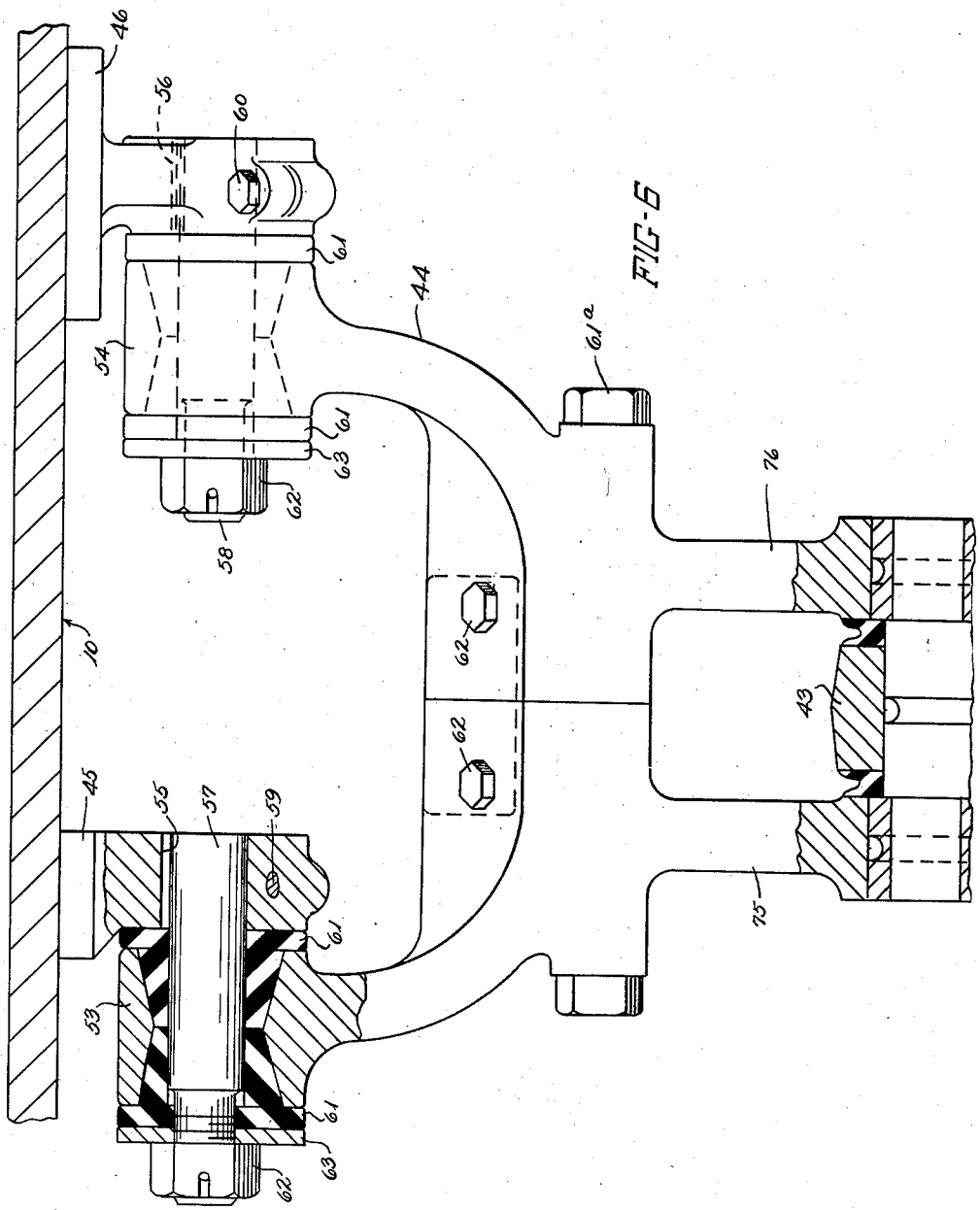

United States Patent Office 2,855,212
Patented Oct. 7, 1958

2,855,212
INDEPENDENT FRONT WHEEL TORSION SUSPENSION FOR VEHICLES

Ray E. Houser, Wooster, Ohio, assignor to The Flxible Company, Loudonville, Ohio, a corporation of Ohio Application November 5, 1956, Serial No. 620,563

4 Claims. (Cl. 280—96.2)

This invention relates to wheel suspensions for vehicles and especially to independent wheel or axle suspensions for front wheels. The invention is especially useful in the construction of large passenger vehicles such as coaches or buses.

It is an object of this invention to provide for independently suspending the axles of a vehicle on rubber torsion springs while providing for independent adjustment of the spring means.

Another object of the invention is to facilitate adjustment of the axle for camber and caster.

Still a further object is to facilitate adjustment of the torsion spring for its supporting attitude and tension.

These and other objects will appear from the following description and the accompanying drawings.

Of the drawings:

Fig. 3 is a detail sectional view, taken on line 3—3' of Fig. 2, showing the spring attitude and tension adjustment;

Fig. 4 is a detail end view of the anchor arm pin;

Fig. 5 is a detail side view of an adjustment bushing;

Fig. 6 is a top view partly in section on line 6—6 of Fig. 2, of the upper or wishbone lever and its frame attaching brackets;

Fig. 9 is an exploded view of the principal parts of the suspension.

Figure 1:
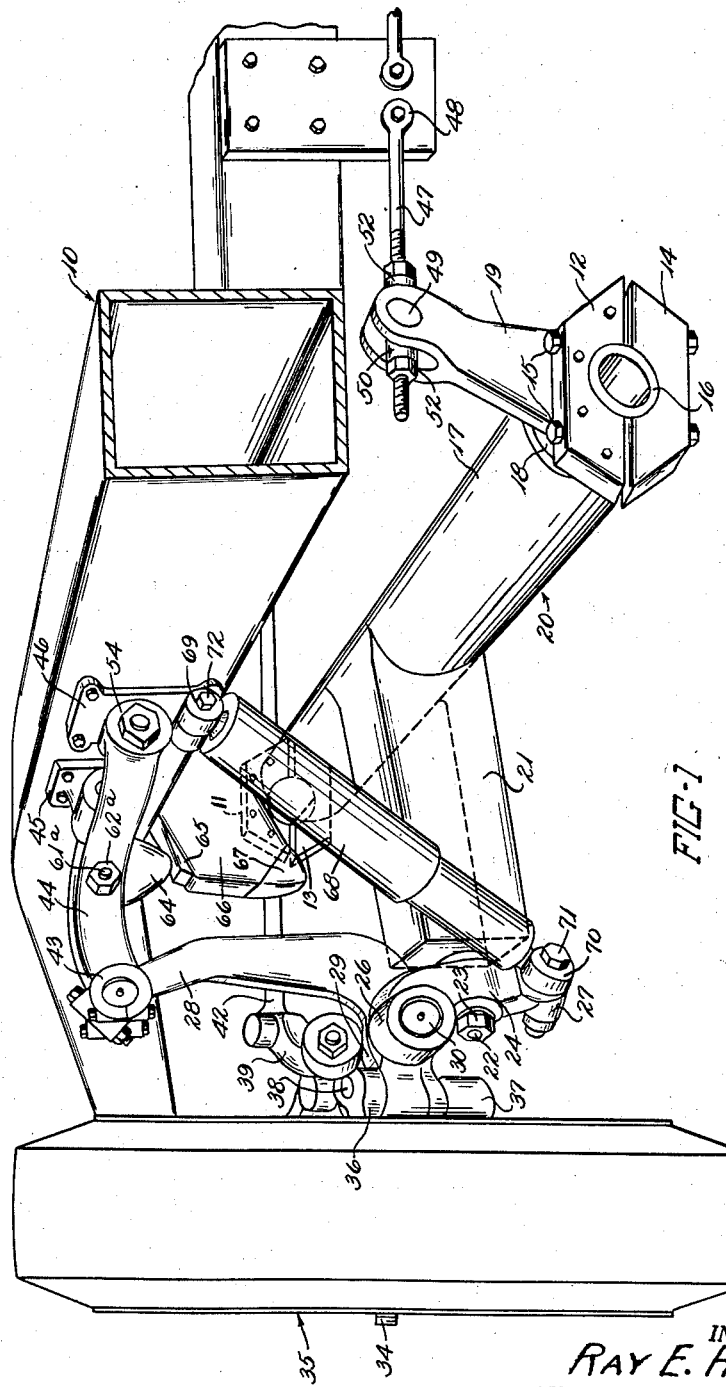
Fig. 1 is a perspective view of an independent front wheel suspension constructed in accordance with and embodying the invention, part of the frame of this vehicle being broken away and parts shown in section.
Figure 2:
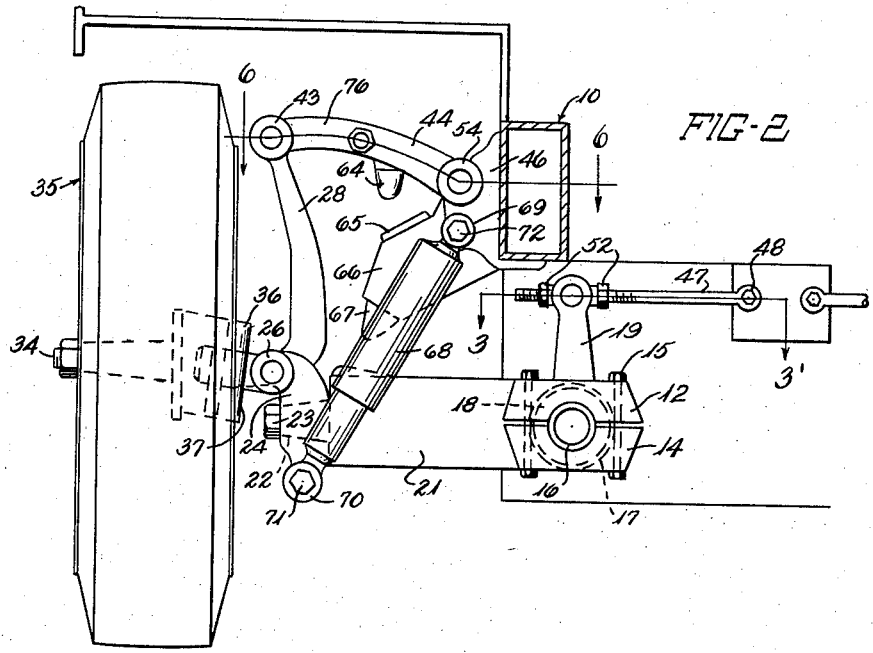
Fig. 2 is a front elevation of the suspension.

Referring to the drawings, the numeral 10 designates a vehicle frame to which are secured bearing blocks 11, 12 having mating blocks 13, 14 secured thereto respectively, as by bolts 15 secured therethrough.

Mounted in the blocks 11, 12 are the ends of a tubular inner metal member 16 of a torsion spring 20. The torsion spring 20 comprises the inner tubular member 16, the outer tubular member 17 thereabout, and a tubular body of resilient rubber-like material 18 therebetween and bonded to the inner and outer members 16 and 17. An anchor lever 19 is secured as by welding to the inner member and extends radially therefrom for anchoring the inner member against rotative movement. The outer member 17 has a radial side arm 21 integral therewith and of hollow construction. A stud 22 is mounted axially of the arm 21 and projects therefrom.

Securely mounted on the projecting end of the stud 22, as by a tapered joint and a nut 23 engaging a thread on the stud, is a fulcrum block 24 formed with a pair of horizontally aligned spaced apart apertured knuckles 25, 26 at its upper end and a stud engaging aperture 27 parallel thereto at its lower end. A vertical link 28 is formed with an apertured boss 29 fitting between knuckles 25, 26 and carrying a pin 30 for rocking movement of link 28 and pin 30 which extends through bushings 31, 32 secured in the apertured knuckles 25, 26 and has a tapered fit in the boss 29. The vertical link 28 also has a vertically bored knuckle 33 at its lower end.

A stub axle 34 for the wheel 35 is formed with a pair of knuckles 36, 37 having aligned vertical bores. The knuckles engage a king pin 38 passing through knuckles 33, 36 and 37 to permit swinging of the axle in a horizontal plane. For so swinging the axle in steering movements, an arm 39 is provided to be secured in an ear 40 of knuckles 36 and may be connected by a ball joint connection 41 with a cross link 42 for steering purposes, the steering mechanism not being a part of the invention.

The upper end of the vertical link 28 is formed with a knuckle 43 whereby it is connected by a wishbone lever 44 to the frame 10 through a pair of bearing brackets 45, 46.

The anchor lever 19 has its outer end anchored to the frame 10 by a rod 47 extending to a stud 48 secured to the frame 10. To provide for adjusting the side clearance or attitude of the torsion spring, the arm 19 has a bifurcated outer end providing spaced apart knuckles embracing a cross-apertured pin 49. A pair of collars 50 each have a concave end face 51 adapted to seat against the sides of the pin 49. The rod 47 is threaded and passes freely through pin 49 and collars 50. A pair of nuts 52 are threaded on the rod at each side of the assembly, and by adjusting the nuts along the rod, the attitude of the torsion spring may be adjusted.

The wishbone lever 44 is provided with a pair of aligned knuckles 53, 54 well spaced apart, and received to the side of brackets 45 and 46, respectively. These brackets are secured to frame 10 and have aligned bores in axially split knuckles having keyways 55, 56. Studs 57, 58 are secured in these bores against rotation by Woodruff keys entering the keyways 55, 56 and against end movement by bolts 59, 60 passing through the knuckles across their split portions and tangential of the studs. Studs 57 and 58 can be adjusted axially of the bores in brackets 45 and 46 after loosening bolts 59 and 60. After any required minor adjustment the bolts 59 and 60 are tightened. Some adjustment of the wishbone lever 44 along the studs 57 and 58 can also be had by adjusting nuts 62. The knuckles 53, 54 of the lever each have doubly flared bores for receiving frusto-conical bushings 61 of rubber-like resilient material. Nuts 62 are secured over threaded ends of studs 57, 58 and bushings 61 are compressed by washers 63 to provide a non-rattling bearing for the wishbone lever. As the studs 57, 58 each extend from their brackets in the same direction, the wishbone lever may be removed laterally of the studs by simply removing the nuts.

To facilitate manufacture, the wishbone lever is made in complementary parts joined along its median plane and secured by a bolt 61a and nut 62a. For further securing it, a pair of bolts 62 are provided for attaching a bumper 64 across the joint between the two parts. This bumper is adapted to engage a plate 65 of a bracket 66 supported by the frame 10 at the highest position of the frame relative to the wheel.

A second bumper 67 is mounted on the lower end of bracket 66 in position to engage arm 21 at its highest position and thereby limit torsional deflection. These bumpers are of resilient rubber-like material.

To control movement of arms 21, an oleo-strut or telescopic shock absorber 68 is provided with ears 69, 70 at opposite ends thereof. The lower ear 70 is secured to a pin 71 secured in bearing 24 of the fulcrum block 24. The upper ear 69 is secured to a pin 72 which is in turn secured in bracket 46. Oil-less and rattle-proof joints are provided by clamping the ears 69, 70 to the pins with resilient rubber bushings therebetween.

The joint between wishbone lever 44 and the vertical link 28 provides for adjusting the camber and caster of the wheel. This construction is illustrated in detail in Figs. 7 and 8 and is an important feature of the invention. Referring to those figures, the outer end of the wishbone 44 terminates in laterally spaced apart arm members 75, 76 having terminal knuckles 77, 78 with aligned bores for receiving bushings 79, 80. Bushings 79, 80 are internally threaded and their outer surfaces each have a circumferential retaining groove. The knuckles 77, 78 are split, as at 82, and are provided with clamp bolts 83 spanning the split portion and entering the grooves 81 so as to prevent end movement of the bushings.

The upper knuckle 43 of the vertical link is also split, as at 84 and provided with a clamp bolt 85 spanning the split. The hinge pin 86 has a central cylindrical portion 87 formed with a central circumferential groove 88 through which the clamp bolt 85 passes. Two opposite end portions 89, 90 are of smaller diameter than the central portion and are eccentric thereto and externally threaded as to engage the threads of bushings 79, 80. These ends are axially aligned with one another. The knuckles 77, 78 are so widely spaced apart, as compared to the width of the knuckle 43 and the length of pin portion 87, as to leave spaces therebetween and these are filled by annular sealing rings 91 of resilient rubber-like material, which is compressible axially. The arrangement is such that with clamp bolts 83, 85 tightened, the pin is held fast by knuckles 43 and its ends may turn in the threads of bushings 79, 80. Swinging movement of arm 44 relative to link 28 is relatively small and does not change the wheel adjustment. By loosening bolt 85, the pin may be rotated to change the effective length of the vertical link 28 and its position relative to the wishbone arm, thereby changing the camber of the wheel. By loosening bolt 85, the pin 86 may also be adjusted axially by rotating it in the threads of bushings 78, 80. For this purpose, a hexagon socket 92 is formed in an end of the pin to receive a wrench. A mark 87 is also provided on the pin to indicate the direction of eccentricity. By always stopping this adjustment with the mark in the same angular position as in starting the adjustment, the camber adjustment is maintained. Axial adjustment of the pin may be used in adjusting caster of the wheel. Such caster adjustment is made possible by the fact that vertical link 28 and fulcrum block 24 are mounted on the single pin 22 having a horizontal axis cross-wise of the vehicle whereby the fulcrum block 24 can move angularly in a vertical plane about stud 22. Also the axle 34 is carried by vertical link 28 with its axis above the axis of pin 22 so as to be moved rearwardly or forwardly of the vehicle by similar movement of the upper end of the vertical link. The resilient mounting of the ends of the oleo-strut 68 also permits such adjustment.

Figures 7, 8:
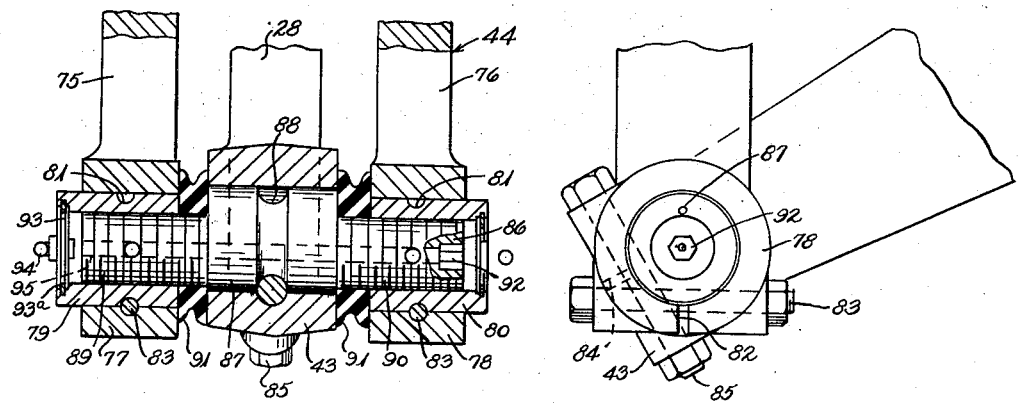
Fig. 7 is a detail sectional view of the camber and caster adjusting joint between the outer end of the wishbone lever and the vertical axle link, parts being broken away.
Fig. 8 is an end view of the joint of Fig. 7.

For protecting the pivotal bearing of Figs. 7 and 8 from dust and to provide for lubrication, the outer end of each bushing 79, 80 is counterbored to receive a closure disc 93 adapted to be held in place by a spring ring 93a. A grease gun fitting 94 is mounted in a central aperture of the disc. Lubrication passages 95 are provided through the pin to the wear surfaces.

Due to the anchoring of both bushings 79, 80 to the wishbone arm by the clamp bolts 83, and the threaded engagement of both ends of the pin 86 with the bushings, the hinge pin 86 serves an additional purpose of anchoring the arms 75, 76 to one another.

The operation of the wheel suspension is believed to be apparent from the foregoing detailed description. Each wheel of the vehicle, of which only one has been shown and described, is mounted from the body or frame of the vehicle independently. The front or dirigible wheels are each suspended by mechanism of the type shown and described so as to be independently adjustable. The load of the vehicle is carried entirely by the torsion spring member 20 in each of which a body of resilient rubber or other similar material is loaded in torsion or circular shear by the vehicle resting upon the ends 16 of its inner member, the arm 21 being loaded by support from the wheel. Riding clearance of the vehicle may be adjusted by adjusting the nuts 52 along the rod 47, it being understood that each wheel suspension has an independent adjusting rod similar to rod 47.

Camber and caster may be adjusted independently on each wheel. The spring ring 93a and plate or disc 93 may be removed for this purpose and the pin may be rotated by inserting a key wrench in the hexagon socket 92.

While one form of the invention has been illustrated and described, it will be apparent to the skilled in the art that various changes and modifications may be made without departing from the spirit or scope of the invention as it is defined by the following claims.

I claim:

1. An independent front wheel suspension for a vehicle, said suspension comprising a torsion spring member of inner and outer tubular members with a body of resilient rubber-like material therebetween and bonded thereto, said spring member having its inner member mounted longitudinally of the vehicle for rotation in bearings provided on the vehicle frame, a side arm extending radially of the outer member of said spring toward a side of the vehicle and supporting a fulcrum block at its outer end, a vertical link member fulcrumed on said block and providing a knuckle bearing for a dirigible stub axle, and a wishbone lever pivotally supported from the vehicle frame and extending laterally thereof to pivotally engage the upper end of said vertical link, said fulcrum block being rotatable in a vertical plane relative to said side arm of said torsion spring, the inner member of said torsion spring having a radial arm for anchoring it against rotation in said bearings, a rod for anchoring said radial arm to the vehicle frame, means for adjusting the length of said rod to adjust the ride clearance of the vehicle, said wishbone lever being pivotally supported from the frame of the vehicle by a pair of bearing brackets spaced apart longitudinally of the vehicle and having aligned bores on an axis longitudinal of the vehicle and formed in split knuckles thereof, keyways in said bores, pivot pins projecting from said bores for pivotally supporting the arms of said wishbone lever, said pins having keys entering said keyways to permit axial adjustment and to prevent relative rotation, and clamp bolts to clamp said knuckles to said pins in an adjusted position.

2. An independent front wheel suspension for a vehicle, said suspension comprising a torsion spring member of inner and outer tubular members with a body of resilient rubber-like material therebetween and bonded thereto, said spring member having its inner member mounted longitudinally of the vehicle for rotation in bearings provided on the vehicle frame, a side arm extending radially of the outer member of said spring toward a side of the vehicle and supporting a fulcrum block at its outer end, a vertical link member fulcrumed on said block and providing a knuckle bearing for a dirigible stub axle, and a wishbone lever pivotally supported from the vehicle frame and extending laterally thereof to pivotally engage the upper end of said vertical link, said fulcrum block being rotatable in a vertical plane relative to said side arm of said torsion spring, the inner member of said torsion spring having a radial arm for anchoring it against rotation in said bearings, a rod for anchoring said radial arm to the vehicle frame, means for adjusting the length of said rod to adjust the ride clearance of the vehicle, said wishbone lever terminating at its outboard end in a pair of spaced apart split knuckles having aligned bores, a pair of internally threaded bushings, one in each of said bores, a pin having threaded ends for entering the threads of said bushings to adjust said vertical link member about its fulcrum and a central enlarged cylindrical portion therebetween eccentric to said threaded ends for engaging a cross bore in the upper end of said vertical link, said pin being rotatably adjustable to adjust the camber of the wheel and longitudinally adjustable to adjust the caster of said wheel.

3. An independent front wheel suspension for a vehicle, said suspension comprising a torsion spring member of inner and outer tubular members with a body of resilient rubber-like material therebetween and bonded thereto, said spring member having its inner member mounted longitudinally of the vehicle for rotation in bearings provided on the vehicle frame, a side arm extending radially of the outer member of said spring toward a side of the vehicle and supporting a fulcrum block at its outer end, a vertical link member fulcrumed on said block and providing a knuckle bearing for a dirigible stub axle, and a wishbone lever pivotally supported from the vehicle frame and extending laterally thereof to pivotally engage the upper end of said vertical link, said fulcrum block being rotatable in a vertical plane relative to said side arm of said torsion spring, the inner member of said torsion spring having a radial arm for anchoring it against rotation in said bearings, a rod for anchoring said radial arm to the vehicle frame, means for adjusting the length of said rod to adjust the ride clearance of the vehicle, said wishbone lever terminating in a pair of spaced apart split knuckles having aligned bores, a pair of internally threaded bushings, one in each of said bores, a pin having threaded ends for entering the threads of said bushings to adjust said vertical link member about its fulcrum and a central enlarged cylindrical portion therebetween eccentric to said threaded ends for engaging a cross bore in the upper end of said vertical link, said pin being rotatably adjustable to adjust the camber of the wheel and longitudinally adjustable to adjust the caster of said wheel, and means for locking said pin to said vertical link and said bushings to said wishbone lever.

4. An independent front wheel suspension for a vehicle, said suspension comprising a torsion spring member of inner and outer tubular members with a body of resilient rubber-like material therebetween and bonded thereto, said spring member having its inner member mounted longitudinally of the vehicle for rotation in bearings provided on the vehicle frame, a side arm extending radially of the outer member of said spring towards a side of the vehicle and supporting a fulcrum block at its outer end, a vertical link member fulcrumed on said block and providing a knuckle bearing for a dirigible stub axle, and a wishbone lever pivotally supported from the vehicle frame and extending laterally thereof to pivotally engage the upper end of said vertical link, said fulcrum block being rotatable in a vertical plane relative to said side arm of said torsion spring, the inner member of said torsion spring having a radial arm for anchoring it against rotation, a rod for anchoring said radial arm to the vehicle frame, means for adjusting the length of said rod to adjust the ride clearance of the vehicle, said wishbone lever being pivotally supported from the frame of the vehicle by a pair of bearing brackets spaced apart longitudinally of the vehicle and having aligned bores on an axis longitudinal of the vehicle and formed in split knuckles of said bearing brackets, keyways in said bores, pivot pins projecting from said bores for pivotally supporting the arms of said wishbone lever, said pins having keys entering said keyways to permit axial adjustment and to prevent relative rotation, and clamp bolts to clamp said knuckles to said pins, the arms of said wishbone lever having aligned bearings with double flared conical bores for mounting about said pins, conical resilient rubber bushings between said bores and said pins, and means for compressing said rubber bushings within said bores.

References Cited in the file of this patent

UNITED STATES PATENTS

| | | |
|---|---|---|
| 2,123,087 | Leighton | July 5, 1938 |
| 2,226,406 | Krotz | Dec. 24, 1940 |
| 2,251,698 | Willson | Aug. 5, 1941 |
| 2,409,500 | Krotz | Oct. 15, 1946 |
| 2,555,649 | Krotz | June 5, 1951 |
| 2,556,767 | McCann | June 12, 1951 |